(12) United States Patent
Fang et al.

(10) Patent No.: US 12,253,693 B2
(45) Date of Patent: Mar. 18, 2025

(54) DISPLAY DEVICE

(71) Applicant: Shenzhen China Star Optoelectronics Semiconductor Display Technology Co., Ltd., Guangdong (CN)

(72) Inventors: Song Fang, Guangdong (CN); Jing Zhang, Guangdong (CN); Haibing Shao, Guangdong (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 192 days.

(21) Appl. No.: 18/191,194

(22) Filed: Mar. 28, 2023

(65) Prior Publication Data

US 2024/0272452 A1    Aug. 15, 2024

(30) Foreign Application Priority Data

Feb. 9, 2023    (CN) .......................... 202310153506.5

(51) Int. Cl.
*G02B 30/33*    (2020.01)
*G02B 5/18*    (2006.01)
*G02F 1/1335*    (2006.01)

(52) U.S. Cl.
CPC ....... *G02B 30/33* (2020.01); *G02F 1/133607* (2021.01); *G02B 2005/1804* (2013.01)

(58) Field of Classification Search
None
See application file for complete search history.

(56) References Cited

U.S. PATENT DOCUMENTS

2011/0228387 A1* 9/2011 Shiau ................... G02B 6/0068
                                                              362/613
2021/0333639 A1* 10/2021 Qiu ..................... H01L 25/0753

* cited by examiner

*Primary Examiner* — Xiaolan Xu
(74) *Attorney, Agent, or Firm* — Nathan & Associates; Menachem Nathan (57) ABSTRACT

The present disclosure provide a display device including a light source, a light transmitting layer including a plurality of micro-lens structures, and a light splitting layer including at least one liquid crystal grating layer and a prism layer. At a first period, light exiting from the first prism surface formed by transmitting a part of the parallel light through the liquid crystal grating layer has a first exit angle. At another period, light exiting from the first prism surface formed by transmitting another part of the parallel light has a second exit angle. A first image is formed in a direction of the first exit angle at a first period, a second image is formed in a direction of the second exit angle at a second period, and the first image and the second image are spliced to form a stereoscopic display image under a larger viewing angle.

20 Claims, 5 Drawing Sheets

Stacking and assembling correctly from bottom to top

FIG. 9

DISPLAY DEVICE

CROSS-REFERENCE TO RELATED APPLICATION

The present disclosure claims priority to and the benefit of Chinese Patent Application No. 202310153506.5, filed on Feb. 9, 2023, the disclosure of which is incorporated herein by reference in its entirety.

TECHNICAL FIELD

The present disclosure relates to the technical field of display, and in particular, to a display device.

BACKGROUND

With the development of display device manufacturing, people put forward higher requirements for the display effect and comprehensive performance of display devices.

There are more and more stereoscopic display modules in the market that can provide stereoscopic visual effects for viewers, so as to further improve people's use experience. In the prior art, the manufactured stereoscopic display module generally has a multi-layer stacked structure generally comprising for example, a backlight unit, a liquid crystal grating layer, and other functional film layers. During normal operation of a stereoscopic panel, light emitted by a backlight unit sequentially transmits through different film layers and emits out. Moreover, during the propagation of light, dynamic light distribution is needed to view in a plurality of directions and finally realize 3D displaying stereoscopic efficiencies. However, the stereoscopic display module manufactured in the prior art has unsatisfactory viewing angle effect when users watch it in different directions, for example, the viewing angle range is small, and viewing experience under a large viewing angle cannot be realized, thereby reducing user experience, which is not conducive to further improving performance of a stereoscopic display module.

In view of the foregoing, in the stereoscopic display module and device manufactured in the prior art, when an user watches, the viewing angle is small in different directions, and stereoscopic display effect under a large viewing angle cannot be realized, thereby reducing the stereoscopic display effect.

SUMMARY

Examples of the present disclosure provide display devices to effectively improve the problem that a stereoscopic display module manufactured in the prior art has a small viewing angle and cannot realize stereoscopic display effect under a large viewing angle.

To solve the above technical problem, an example of the present disclosure provides a display module, which comprises:

a light source comprising a light receiving member and a plurality of light emitting diodes, wherein the light receiving member is provided with a plurality of accommodating spaces, each of the plurality of light emitting diodes is disposed in one of the plurality of accommodating spaces, and the light receiving member is used for gathering light beams emitted by the plurality of light emitting diodes;

a light transmitting layer disposed on one side of the light source where the light source emits light and provided with a plurality of micro-lens structures for converting the light beams into parallel light; and a light splitting layer disposed on one side of the light transmitting layer away from the light source, wherein the light splitting layer comprises at least one liquid crystal grating layer and a prism layer disposed on one side of the liquid crystal grating layer away from the light source;

wherein the prism layer comprises at least a first prism surface and a second prism surface disposed on one side of the first prism surface, and at a first period, a part of the parallel light transmits through the liquid crystal grating layer, irradiates onto the first prism surface, and emits from a surface of the prism layer at a first exit angle; at a second period, another part of the parallel light transmits through the liquid crystal grating layer, irradiates onto the second prism surface, and exits from a surface of the prism layer at a second exit angle.

According to an example of the present disclosure, the liquid crystal grating layer comprises a first region and a second region adjacent to the first region;

wherein the first prism surface corresponds with the first region, the second prism surface corresponds with the second region, an orthographic projection of the first prism surface on the liquid crystal grating layer is located in the first region, and an orthographic projection of the second prism surface on the liquid crystal grating layer is located in the second region.

According to an example of the present disclosure, liquid crystals with a first inclination angle is disposed in the first region, liquid crystals with a second inclination angle is disposed in the second region, and the first inclination angle is different from the second inclination angle at a same period.

According to an example of the present disclosure, the parallel light transmits through the first region or the second region at a same period.

According to an example of the present disclosure, the first region has a width the same as that of the second region.

According to an example of the present disclosure, the first prism surface and the second prism surface share a common side, and the common side is correspondingly disposed at a position where the first region intersects the second region.

According to an example of the present disclosure, the first prism surface and the liquid crystal grating layer form a first included angle, the second prism surface and the liquid crystal grating layer form a second included angle, and the first included angle is the same as the second included angle.

According to an example of the present disclosure, an amount and an irradiation area of the parallel light reaching the first prism surface at the first period are the same as an amount and an irradiation area of the parallel light reaching the second prism surface at the second period.

According to an example of the present disclosure, an absolute value of concentricity between a light emitting center of the light emitting diode and an optical axis of the micro-lens structure is equal to or less than 0.1°.

According to an example of the present disclosure, the light transmitting layer comprises a transparent substrate and the plurality of micro-lens structures; the plurality of micro-lens structures are disposed on the transparent substrate in the form of an array, and the plurality of micro-lens structure is disposed in one-to-one correspondence with the plurality of light emitting diodes;

wherein the micro-lens structure is disposed on one side of the transparent substrate away from the light source; or the micro-lens structure is disposed on one side of the transparent substrate close to the light source.

Examples of the present disclosure have effects as follows: compared with the prior art, examples of the present disclosure provide a display device including a light source, a light transmitting layer and a light splitting layer. The light transmitting layer includes a plurality of micro-lens structures, thus parallel light can be obtained through the light transmitting layer. The light splitting layer includes at least one liquid crystal grating layer and a prism layer. At a first period, a part of the parallel light transmits through the liquid crystal grating layer, irradiates onto the first prism surface, and emits from a light exit surface of the prism layer at a first exit angle. At another period, another part of the parallel light transmits through the liquid crystal grating layer, irradiates onto the second prism surface, and exits from a light exit surface of the prism layer at a second exit angle. In examples of the present disclosure, a first image is formed in a direction of the first exit angle at a first period, a second image is formed in a direction of the second exit angle at a second period, and the first image and the second image are spliced to form a stereoscopic display image under a larger viewing angle, so that splicing of viewing angle can be realized, thereby improving the stereoscopic viewing angle and the display effect.

BRIEF DESCRIPTION OF THE DRAWINGS

In order to more clearly describe the technical solutions in examples of the present disclosure, hereinafter, the appended drawings used for describing the examples in the present disclosure will be briefly introduced. Apparently, the appended drawings described below are only directed to some examples of the present disclosure, and for a person skilled in the art, without expenditure of creative labor, other drawings can be derived on the basis of these appended drawings.

DETAILED DESCRIPTION

The following description provides different embodiments or examples to illustrate different structures of the present disclosure with reference to the accompanying drawings in examples of the present disclosure. In order to simplify the present disclosure, components and arrangements of specific examples are described below. In addition, examples of various specific processes and materials provided by the present disclosure are applications of other processes that those of ordinary skill in the art can realize. All other examples obtained by those skilled in the art without creative work belong to the protection scope of the present disclosure.

It should be understood in the description of the present disclosure that terms such as "central", "horizontal", "length", "width", "thickness", "upper", "lower", "front", "back", "left", "right", "vertical", "horizontal", "top", "bottom", "inner", "outer", "clockwise", "counterclockwise", etc. indicate direction or position relationships shown based on the drawings, and are only intended to facilitate the description of the present disclosure and the simplification of the description rather than to indicate or imply that the indicated apparatus or assembly must have a specific direction or constructed and operated in a specific direction, and therefore, shall not be understood as a limitation to the present disclosure. In addition, the terms such as "first" and "second" are only used for the purpose of description, rather than being understood to indicate or imply relative importance or hint the number of indicated technical features. Thus, the feature limited by "first" and "second" can explicitly or impliedly comprise one or more features.

With continuous development of display device manufacturing, people put forward higher requirements for the performance and display effect of display devices.

Stereoscopic 3D display devices are widely accepted because it can give people a stereoscopic feeling during use. However, there are still some defects in performance of the existing stereoscopic 3D display devices, such as small stereoscopic viewing angle during stereoscopic display, which is not conducive to the further improvement of its comprehensive performance.

An example of the present disclosure provides a stereoscopic display device to effectively improve the problem that a stereoscopic display module manufactured in the prior art has a small viewing angle and unsatisfactory display effect.

Figure 1:
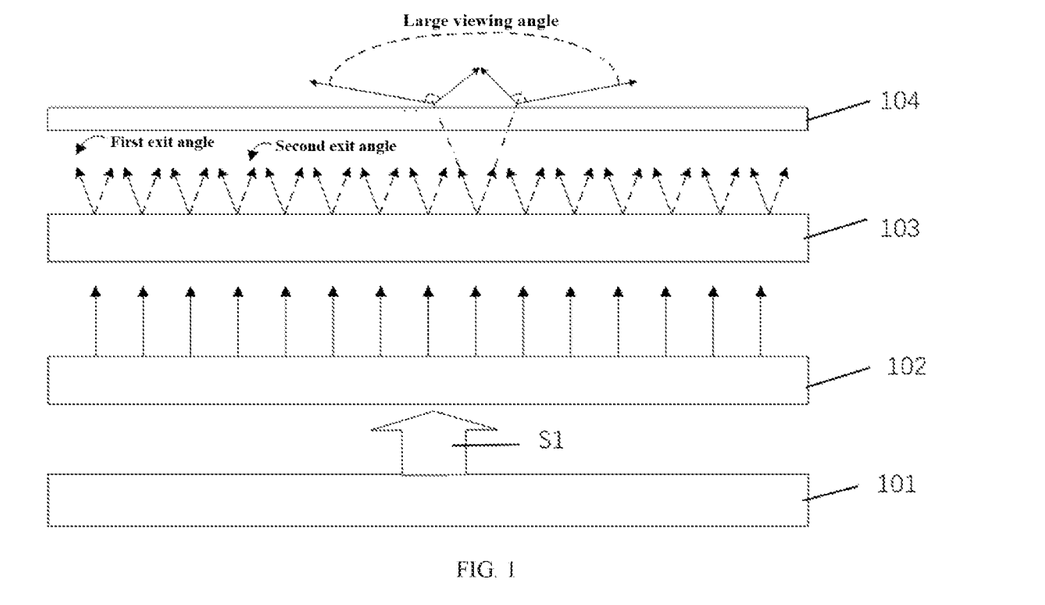
FIG. 1 is a schematic diagram of a film structure of a display device according to an example of the present disclosure.

As shown in FIG. 1, schematic diagram of a film structure of a display device according to an example of the present disclosure. The display device includes a light source 101, a light transmitting layer 102, a light splitting layer 103, and a 3D panel. Specifically, a plurality of light emitting members may be disposed in the light source 101, for example, a plurality of light emitting diodes disposed in an array, and backlight is provided to the panel through the light emitting diodes. In this example of the present disclosure, the light source 101 may radiate a light beam SI onto one side of the light source where the light source emits light, and the light beam SI transmits through different film layers and emits to the outside.

Meanwhile, the light transmitting layer 102 is disposed on one side of the light source 101 where the light source emits light. When light is emitted from the light source 101, it can transmit through the light transmitting layer 102 and propagate. In examples of the present disclosure, a plurality of micro-lens structures are disposed on the light transmitting layer 102. For example, a plurality of micro-lens structures are disposed in an array on one side of the light transmitting layer 102, so that divergent light beam can be converted into parallel light. When light passes through the light transmitting layer 102, divergent light beam emitted from the light source 101 becomes parallel light, and then the parallel light continues to propagate.

In examples of the present disclosure, the light transmitting layer 103 is disposed on one side of the light transmitting layer 102 away from the light source 101. When light emitted from the light source 101 transmits through the light transmitting layer 102, it will continue to propagate into the light splitting layer 103. In examples of the present disclosure, light emitted from the light transmitting layer 102 is a parallel light beam, so the light entering the light splitting layer 103 is also a parallel light beam.

In examples of the present disclosure, the light splitting layer 103 includes at least one liquid crystal grating layer and a prism layer disposed on one side of the liquid crystal grating layer away from the light source. Through the comprehensive action of the liquid crystal grating layer and the prism layer in the light splitting layer 103, light incident into the 3D panel 104 has a larger incident angle, and finally the visual angle and comprehensive performance of the stereoscopic display device are effectively improved.

Figure 2:
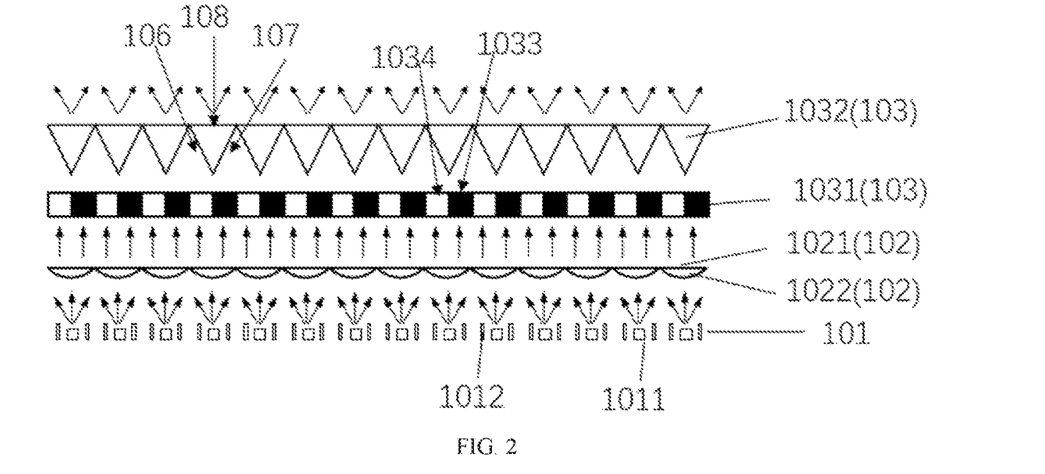
FIG. 2 is a schematic diagram of structure of a display device and propagation effect of internal light according to an example of the present disclosure.

Specifically, as shown in FIG. 2, a schematic diagram of structure of a display device and propagation effect of internal light according to an example of the present disclosure. In the light source 101, the light source 101 includes a light receiving member 1012 and a plurality of light emitting diodes 1011. The light receiving member 1012 is used to reduce the divergence angle of light emitted from the light emitting diode 1011, thereby reducing the divergence of light irradiated to the light transmitting layer 102. Meanwhile, the plurality of light emitting diodes 1011 are disposed and emit light according to a certain arrangement rule, and different light emitting diodes 1011 have the same light emitting efficiency, so as to ensure that different areas of the display device have consistent display effects.

Figure 3:
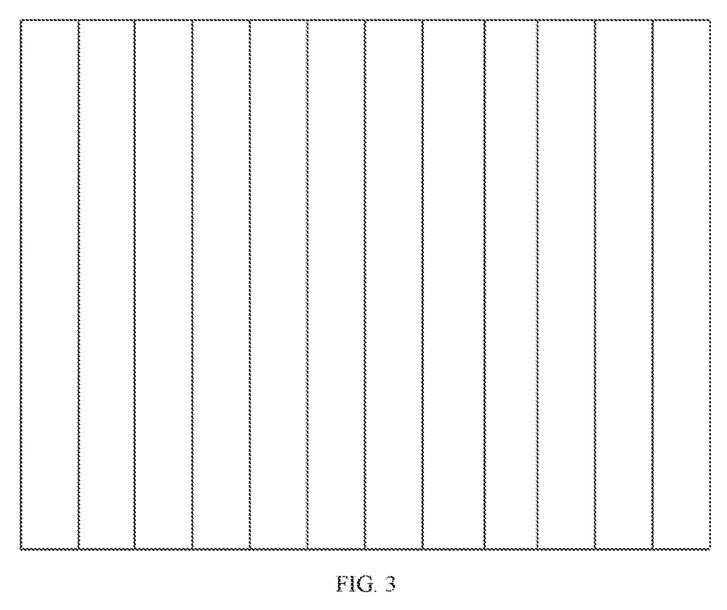
FIG. 3 is a schematic structural diagram of a light receiving member according to an example of the present disclosure.

Meanwhile, the light receiving member 1012 is disposed with a plurality of accommodating spaces in which a plurality of light emitting diodes are correspondingly disposed, as shown in FIG. 3, a schematic structural diagram of a light receiving member according to an example of the present disclosure. Referring to FIG. 3 for details, the light receiving member 1012 is a housing with grooves, and the accommodating spaces are grooves on the light receiving member 1012, which is used for accommodating a cylindrical lens to receive light asymmetrically.

Figure 4:
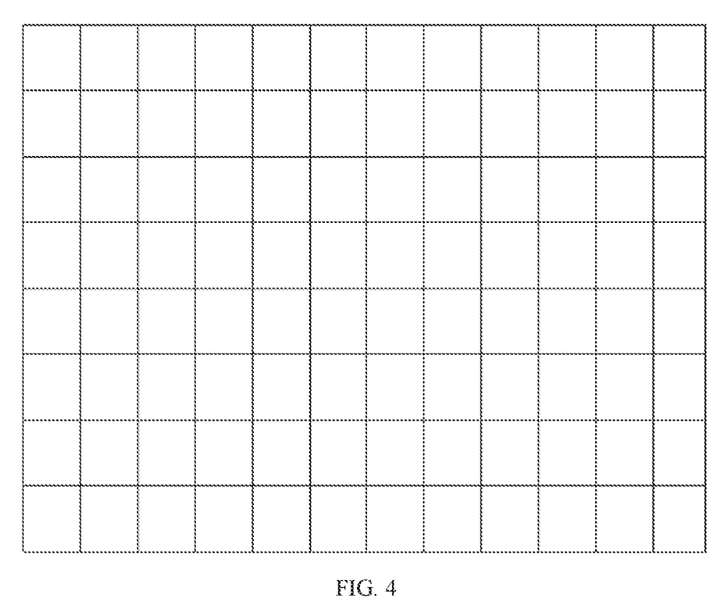
FIG. 4 is a schematic structural diagram of another light receiving member according to an example of the present disclosure.

Further, as shown in FIG. 4, a schematic structural diagram of another light receiving member according to an example of the present disclosure. Combining with the structure in FIG. 3, in examples of the present disclosure, the light receiving member 1012 includes four wall wallboards, which enclose an accommodating space. This type of light receiving member is used for accommodating two-dimensional microlenses, so as to receive light symmetrically. Each of the plurality of light emitting diodes 1011 are correspondingly disposed in each of the accommodating spaces. Specifically, the light emitting diodes 1011 are disposed in one-to-one correspondence with the accommodating spaces, wherein "one-to-one correspondence" means that one accommodation space is disposed with a light emitting diode 1011.

Figure 5:
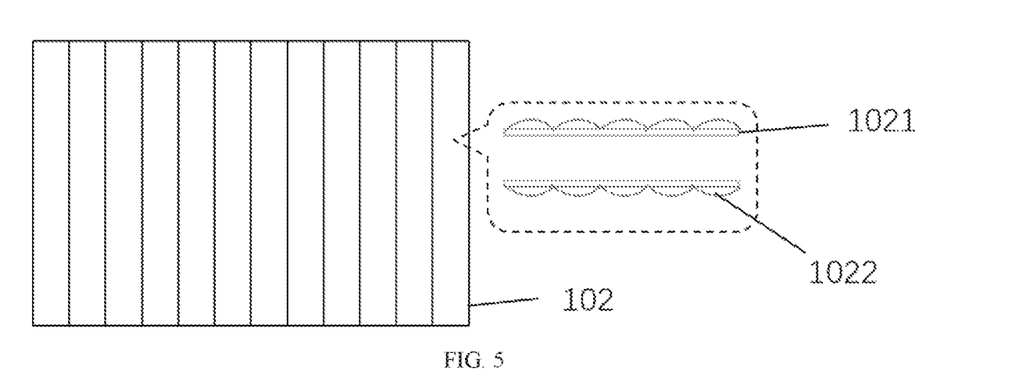
FIG. 5 is a schematic plan view of a light transmitting layer according to an example of the present disclosure.

Further, when the light transmitting layer 102 further includes a transparent substrate 1021 and a plurality of micro-lens structures 1022, as shown in FIG. 5, a schematic plan view of a light transmitting layer according to an example of the present disclosure. The light transmitting layer 102 also includes a transparent substrate 1021 and a plurality of micro-lens structures 1022. The transparent substrate 1021 allows light to pass through on the one hand, and is used to carry the micro-lens structure 1022 on the other hand. In addition, the transparent substrate 1021 also has the function of receiving light.

Here, the micro-lens structure 1022 collimates light emitted by the light emitting diode 1011. The type of the micro-lens structure 1022 may be selected according to actual requirements, and parallel light can be obtained after the micro-lens structure 1022 acts on the light. In an example, the micro-lens structure 1022 is a cylindrical lens. In another example, the micro-lens structure 1022 is a two-dimensional lens. Specifically, when disposing the micro-lens structure 1022 and the transparent substrate 1021, the micro-lens structure 1022 may be disposed on an end face of the transparent substrate 1021 close to the light source 101, or the micro-lens structure 1022 may be disposed on an end face of the transparent substrate 1021 away from the light source 101. That is, the relative positions of the transparent substrate and the micro-lens structure can be changed. In the following examples, taking the micro-lens structure 1022 disposing on one side of the transparent substrate close to the light source 101 as an example.

Further, in examples of the present disclosure, when disposing the micro-lens structure 1022, optical axis center of the micro-lens structure 1022 corresponds with the light emitting center of the light emitting diode in the light source, and an absolute value of concentricity between a light emitting center of the light emitting diode and an optical axis of the micro-lens structure is equal to or less than 0.1°. Meanwhile, the divergence angle of the light emitted by the light source after passing through the light transmitting layer is less than or equal to 10°, thereby ensuring the collimating effect of the micro-lens structures 1022 and the light receiving member 1012 on the light, and improving comprehensive performance of the panel.

Further, in examples of the present disclosure, the light splitting layer 103 is disposed on one side of the light transmitting layer 102 away from the light source 101. The light splitting layer 103 includes at least one liquid crystal grating layer 1031. Since the light transmitting layer 102 can converge divergent light beams, all the light reaching the liquid crystal grating layer 1031 is parallel light.

Figure 6:
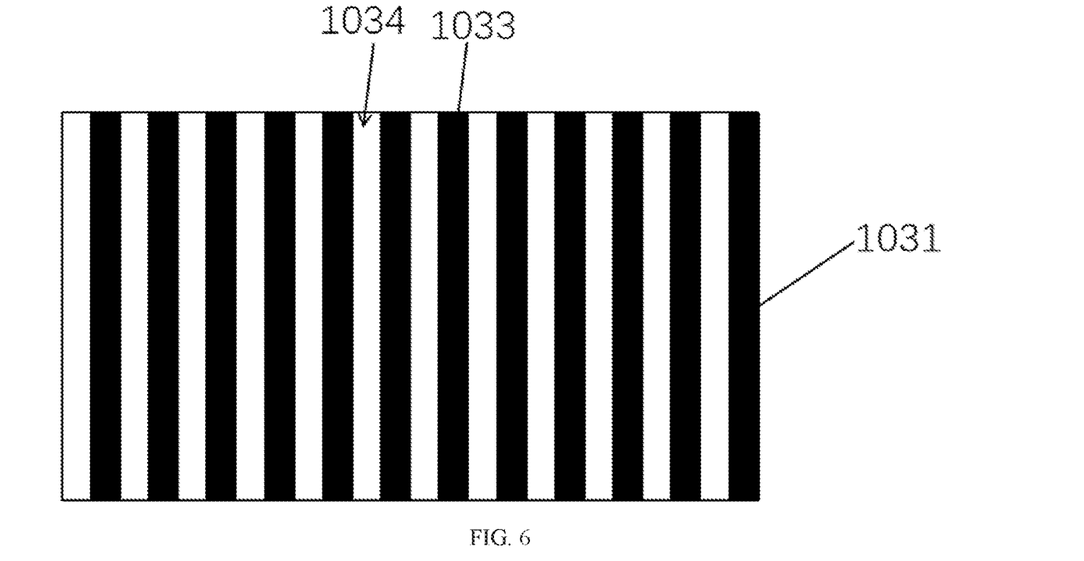
FIG. 6 is a schematic plan view of a liquid crystal grating layer according to an example of the present disclosure.

In examples of the present disclosure, when disposing the liquid crystal grating layer 1031, liquid crystal molecules are disposed therein. Different liquid crystal molecules act on the parallel light and change the transmission of light. As shown in FIG. 6, a schematic plan view of a liquid crystal grating layer according to an example of the present disclosure. The liquid crystal grating layer 1031 includes a plurality of first regions 1034 and a plurality of second regions 1033 disposed alternately in sequence. The first region 1034 has a width same as that of the second region 1033. A driving electrode is disposed at a position corresponding with the first regions 1034 and the second regions 1033. At different periods, driving voltage on the driving electrode can be changed, so that the corresponding liquid crystal molecules in different regions are deflected to different degrees, thus ensuring that the parallel light in the required region can be transmitted.

Specifically, a plurality of liquid crystal molecules are disposed in the first region 1034 and the second region 1033. In examples of the present disclosure, a driving electrode is further disposed at a position corresponding with the first region 1034 and the second region 1033. When different voltages are applied to the driving electrode in the corresponding region, liquid crystal molecules in the first region 1034 or the second region 1033 will have different inclinations under different voltages, so that light can be selectively transmitted through the liquid crystal grating layer 1031.

In examples of the present disclosure, the first region 1034 and the second region 1033 may be disposed has have the same width, and the specific width value may be disposed according to different product models, which is not repeated herein. In examples of the present disclosure, the required parallel light can be obtained by regulating the liquid crystal molecules in different regions of the liquid crystal grating layer, thus realizing display effect under a large viewing angle of a stereoscopic display device.

Specifically, a prism layer 1032 is further disposed on the liquid crystal grating layer 1031. In examples of the present disclosure, in order to improve effect of the prism layer on light and to achieve a stereoscopic display effect under a large viewing angle, the prism layer 1032 is described by taking a triangular prism structure as an example. Optionally, the prism layer 1032 may be provided as a prism with other numbers of other prism surfaces, which will not be described herein.

When the prism layer 1032 is provided as a triangular prism structure, the triangular prism includes prism surfaces in three different directions. Specifically, the triangular prism includes a first prism surface 106, a second prism surface 107, and a third prism surface 108.

The first prism surface 106, the second prism surface 107, and the third prism surface 108 are disposed in different directions. In examples of the present disclosure, the third prism surface 108 is disposed as an upper surface of the prism layer 1032, and the upper surface is disposed as a surface with a horizontal structure. When light transmits through the upper surface, it can directly emit from the surface with a horizontal structure. Meanwhile, the first prism surface 106 intersects with the second prism surface 107, and forms a common side at the intersecting position. With respect to FIG. 2 for details, in a schematic plan view, the common side of the first prism surface 106 and the second prism surface 107 is shown an intersecting vertex. This vertex corresponds with the common side.

In examples of the present disclosure, when disposing the grating liquid crystal layer 1031 and the corresponding prism layer 1032, the prism layer 1032 has a specific corresponding relationship with the grating liquid crystal layer 1031, so as to control light transmission, and realize a large viewing angle effect of a stereoscopic display device.

Specifically, the first prism surface 106 is disposed in correspondence with the first region 1034, and the second prism surface 107 is disposed in correspondence with the second region 1033. Optionally, an orthographic projection of the first prism surface 106 on the liquid crystal grating layer 1031 is located in the first region 1034, and an orthographic projection of the second prism surface 107 on the liquid crystal grating layer 1031 is located in the second region 1033.

When parallel light transmits through the light splitting layer 103, light transmission in different regions is controlled. For example, in the first region 1034, the liquid crystals have a first inclination angle, while in the second region 1033, the liquid crystals have a second inclination angle different from the first inclination angle. In this way, light in a specific direction can transmit through the corresponding region to reach different prism surfaces, thereby achieving different display effects.

In examples of the present disclosure, the first inclination angle of the liquid crystals in the first region 1034 can be adjusted at a first period, so that the corresponding parallel light in the first region 1034 can transmit and reach the first prism surface 106, while the second inclination angle of the liquid crystal molecules in the second region 1033 can be adjusted at a second period, so that the corresponding parallel light in the second region 1033 can transmit and reach the second prism surface 107 only. Therefore, in examples of the present disclosure, during the stereoscopic display process, the first inclination angle of the liquid crystal molecules in the first region is different from the second inclination angle of the liquid crystal molecules in the second region at the same period. In this way, the dynamically changing light distribution can be adjusted, and light distribution at different times can be switched. Light directions can be switched by time division multiplexing, and each direction corresponds with a viewing angle, so that the viewing angles in different directions can be spliced, thereby achieving the purpose of widening the viewing angle in stereoscopic display.

Further, in examples of the present disclosure, when disposing the prism layer 1032, in order to ensure the effect of light in different regions, the amount and the irradiation area of the parallel light reaching the first prism surface 106 at the first time period are same as the amount and irradiation area of the parallel light reaching the second prism surface 107 at the second period, so as to ensure consistent display effect when viewing in different directions, and to ensure the comprehensive performance of a stereoscopic display device.

Further, in examples of the present disclosure, the common side corresponding with the first prism surface 106 and the second prism surface 107 is disposed at the junction between the first region 1034 and the second region 1033, for example, it can be disposed at a corresponding position directly above the junction of the first region 1034 and the second region 1033.

Figure 7:
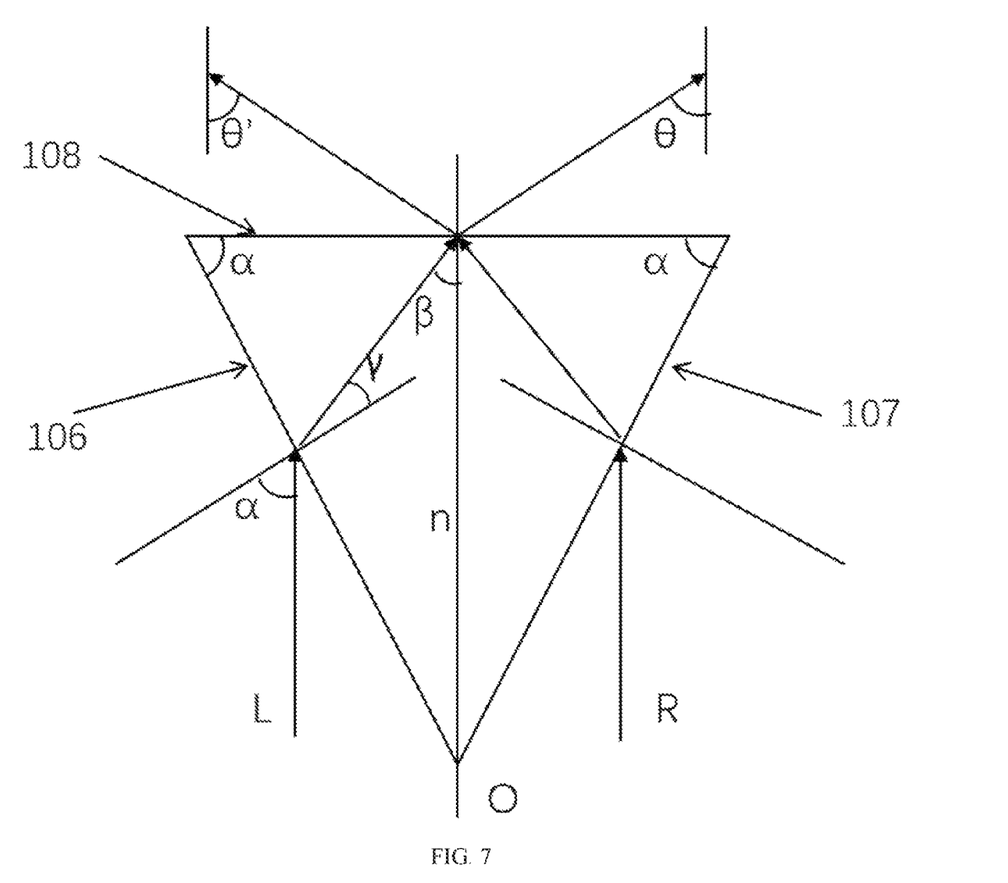
FIG. 7 is a schematic diagram of propagation of parallel light in a prism layer at different periods according to an example of the present disclosure.

As shown in FIG. 7, a schematic diagram of propagation of parallel light in a prism layer at different periods according to an example of the present disclosure. Combining with the film structure in FIG. 2, in examples of the present disclosure, at the first period T1, a corresponding partial parallel light L in the first region 1034 reaches the first prism surface 106, wherein an incident angle of the parallel light with respect to the first prism surface 106 is α. When the parallel light L reaches the first prism surface 106, it will be refracted by the prism and continues to propagate in the prism layer. When the refracted light propagates to the third prism surface 108, it will be refracted again by the third prism surface 108 and pass through. At this time, an exit angle of exit light with respect to the third prism surface 108 is a first exit angle θ. In examples of the present disclosure, the third prism surface is the surface of the prism, that is, the light exit surface of the prism. Detailed can be seen in FIG. 7, the exit light corresponding with the first exit angle θ is inclined rightward and corresponds with the first image.

Similarly, at the second period T2, a corresponding partial parallel light R in the second region 1033 reaches the second prism surface 107, and the propagation of the parallel light R in the prism participates in the propagation of the parallel light L in the prism. When the parallel light R reaches the second prism surface 107, it will be refracted by the prism and continues to propagate in the prism layer. When the refracted light propagates to the third prism surface 108, it will be refracted again and transmit through the third prism surface 108. At this time, an exit angle of exit light with respect to the third prism surface 108 is a second exit angle θ', the exit light corresponding with the second exit angle θ' is inclined leftward and corresponds with the second image. In examples of the present disclosure, the first image formed in the direction of the first exit angle at the first period and the second image formed in the direction of the second exit angle at the second period can be spliced to form a stereoscopic display image under a larger viewing angle, thus realizing the splicing of viewing angles, and further improving the stereoscopic viewing angle and display effect.

In examples of the present disclosure, the corresponding incident angle and reflection angle of each light on different prism surfaces are illustrated in FIG. 7, which will not be described in detail herein. In examples of the present disclosure, the first prism 106 and the second prism 107 are disposed symmetrically with respect to the junction of the first region 1034 and the second region 1033. Therefore, the parallel light L and the parallel light R may have the same incident angle α after passing through different prism surfaces; meanwhile, the parallel light L and the light R may also have the same exit angle θ after being transmitted, thus ensuring the same display effect when viewed at different positions.

Specifically, in order to improve the display effect of a stereoscopic display device, in examples of the present disclosure, the first prism surface 106, the second prism surface 107 and the third prism surface 108 may form an isosceles triangular prism. That is, the first prism surface 106 and the third prism surface 108 have an included angle α, while the second prism surface 107 and the third prism surface 108 also have an included angle α. Further, the included angle formed by the two different prism surfaces is the same as the incident angle of the parallel light L and the parallel light R entering the corresponding prism surface, both are disposed as α, thus ensuring that the stereoscopic display device has an optimal viewing effect when viewing in different directions.

Figure 8:
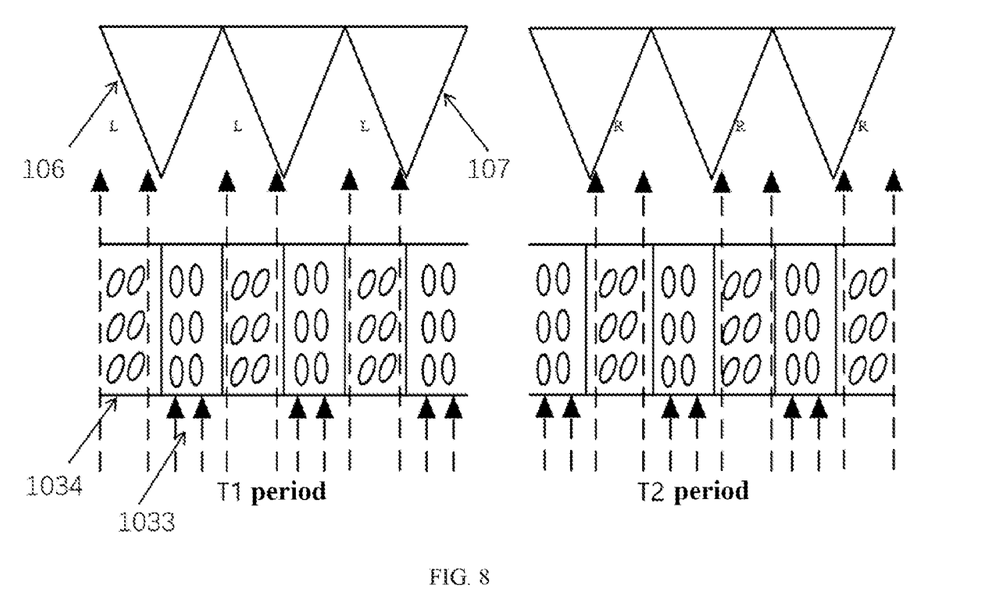
FIG. 8 is a schematic diagram of effect of light at different periods according to an example of the present disclosure.

As shown in FIG. 8, a schematic diagram of effect of light at different periods according to an example of the present disclosure. Specifically, at the first period T1, in the liquid crystal grating layer, the liquid crystals in the first region 1034 have a first inclination angle, at which the corresponding parallel light L in the first region 1034 can transmit through the liquid crystal grating layer, while the corresponding parallel light in the second region 1033 cannot transmit through the liquid crystal grating layer.

At the second period T2, in the liquid crystal grating layer, the inclination angles of the liquid crystal molecules in the first region 1034 and the second region 1033 can be adjusted by the driving electrode, and the liquid crystals in the second region 1033 have a second inclination angle, at which the corresponding parallel light R in the second region 1033 can transmit through the liquid crystal grating layer, and the corresponding parallel light in the first region 1034 cannot transmit through the liquid crystal grating layer, so that light at different times can be screened, thereby improving the display viewing angle.

In examples of the present disclosure, when disposing the first prism surfaces 106 corresponding with the prism layer, the first prism surfaces 106 corresponding with different prisms are inclined towards the same direction, and when disposing the second prism surfaces 107, the second prism surfaces 107 corresponding with different prisms are inclined towards the same direction. Further, inclined angle of the first prism surface 106 is the same as that of the second prism surface 107, and it can be disposed as α.

Figure 9:
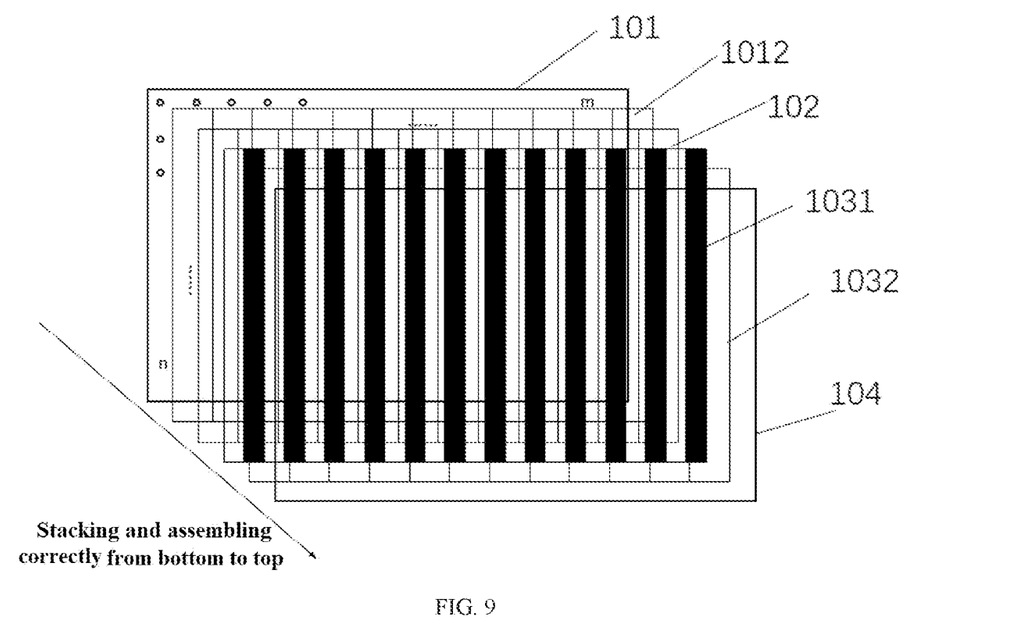
FIG. 9 is a schematic diagram of a stacking structure of a display device according to an example of the present disclosure.

Further, as shown in FIG. 9, a schematic diagram of a stacking structure of a display device according to an example of the present disclosure. When disposing the above-mentioned different structures, various layers provided in examples of the present disclosure are stacked sequentially from bottom to top. Specifically, the light source 101, the light receiving member 1012, the light transmitting layer 102, the liquid crystal grating layer 1031, the prism layer 1032, and the 3D panel 104 are sequentially disposed from bottom to top to finally obtain the display device provided in examples of the present disclosure. After manufacturing of the display device is completed, other functional layers are continuously manufactured on the display device, which will not be described in detail herein, so as to obtain a stereoscopic display device.

In examples of the present disclosure, the display device may be any product or component that can be displayed or touched, such as a mobile phone, a computer, an electronic paper, a display, a notebook computer, a digital photo frame, etc., the specific type thereof is not specifically limited.

In view of the foregoing, display devices according to examples of the present disclosure have been described in detail above, and the principles and embodiments of the present disclosure are described by using specific examples herein. Descriptions of the above examples are merely intended to help understand the technical solutions and core ideas of the present disclosure. Although the present disclosure has been described in terms of preferred examples, the foregoing preferred examples are not intended to limit the present disclosure. Those skilled in the art can make various changes or modifications without departing from the present disclosure. Therefore, the scope of protection of the present disclosure is defined by the claims

What is claimed is:

1. A display device comprising:
a light source comprising a light receiving member and a plurality of light emitting diodes, wherein the light receiving member is provided with a plurality of accommodating spaces, each of the plurality of light emitting diodes is disposed in one of the plurality of accommodating spaces, and the light receiving member is used for gathering light beams emitted by the plurality of light emitting diodes;
a light transmitting layer disposed on one side of the light source where the light source emits light and provided with a plurality of micro-lens structures for converting the light beams into parallel light; and
a light splitting layer disposed on one side of the light transmitting layer away from the light source, wherein the light splitting layer comprises at least one liquid crystal grating layer and a prism layer disposed on one side of the liquid crystal grating layer away from the light source;
wherein the prism layer comprises at least a first prism surface and a second prism surface disposed on one side of the first prism surface; wherein at a first period, light exiting from the first prism surface formed by transmitting a part of the parallel light through the liquid crystal grating layer has a first exit angle; and, at a second period, light exiting from the first prism surface formed by transmitting another part of the parallel light has a second exit angle.

2. The display device according to claim 1, wherein the liquid crystal grating layer comprises a first region and a second region adjacent to the first region;
wherein the first prism surface corresponds with the first region, the second prism surface corresponds with the second region, an orthographic projection of the first prism surface on the liquid crystal grating layer is located in the first region, and an orthographic projection of the second prism surface on the liquid crystal grating layer is located in the second region.

3. The display device according to claim 2, wherein liquid crystal with a first inclination angle is disposed in the first region, liquid crystal with a second inclination angle is disposed in the second region, and the first inclination angle is different from the second inclination angle at a same period.

4. The display device according to claim 2, wherein the parallel light transmits through the first region or the second region at a same period.

5. The display device according to claim 2, wherein the first region has a width same as that of the second region.

6. The display device according to claim 2, wherein the first prism surface and the second prism surface share a common side, and the common side is correspondingly disposed at a position where the first region intersects the second region.

7. The display device according to claim 1, wherein the first prism surface and the liquid crystal grating layer form a first included angle, the second prism surface and the liquid crystal grating layer form a second included angle, and the first included angle is the same as the second included angle.

8. The display device according to claim 1, wherein an amount and an irradiation area of the parallel light reaching the first prism surface at the first period are the same as an amount and an irradiation area of the parallel light reaching the second prism surface at the second period.

9. The display device according to claim 1, wherein an absolute value of concentricity between a light emitting center of the light emitting diode and an optical axis of the micro-lens structure is equal to or less than 0.1°.

10. The display device according to claim 9, wherein the light transmitting layer comprises a transparent substrate and the plurality of micro-lens structures; the plurality of micro-lens structures are disposed on the transparent substrate in the form of an array, and the plurality of micro-lens structure is disposed in one-to-one correspondence with the plurality of light emitting diodes; and wherein the micro-lens structure is disposed on one side of the transparent substrate away from the light source.

11. The display device according to claim 9, wherein the light transmitting layer comprises a transparent substrate and the plurality of micro-lens structures; the plurality of micro-lens structures are disposed on the transparent substrate in the form of an array, and the plurality of micro-lens structure is disposed in one-to-one correspondence with the plurality of light emitting diodes; and wherein he micro-lens structure is disposed on one side of the transparent substrate close to the light source.

12. The display device according to claim 1, wherein the light receiving member comprises four wall wallboards, which enclose the accommodating space.

13. The display device according to claim 1, wherein each of the plurality of micro-lens structures is a cylindrical lens.

14. The display device according to claim 1, wherein each of the plurality of micro-lens structures is a two-dimensional lens.

15. The display device according to claim 9, wherein an optical axis center of each of the plurality of micro-lens structures corresponds with the light emitting center of each of the plurality of light emitting diode in the light source.

16. The display device according to claim 1, wherein the prism layer further comprises a third prism surface, the third prism surface is disposed as an upper surface of the prism layer, and the upper surface is disposed as a surface with a horizontal structure.

17. The display device according to claim 1, wherein the light source, the light receiving member, the light transmitting layer, the liquid crystal grating layer and the prism layer are sequentially disposed from bottom to top on a 3D panel.

18. The display device according to claim 1, wherein the prism layer further comprises other prism surfaces.

19. The display device according to claim 1, wherein the light receiving member is a housing with grooves.

20. The display device according to claim 1, wherein the display device a mobile phone, a computer, an electronic paper, a display, a notebook computer, a digital photo frame, or other products or components that can be displayed or touched.

* * * * *